United States Patent
Enstone et al.

(10) Patent No.: US 7,877,803 B2
(45) Date of Patent: Jan. 25, 2011

(54) AUTOMATED IMMUNE RESPONSE FOR A COMPUTER

(75) Inventors: Mark Richard Enstone, Austin, TX (US); James Anthony Cureington, Cedar Park, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1612 days.

(21) Appl. No.: 11/167,346

(22) Filed: Jun. 27, 2005

(65) Prior Publication Data

US 2006/0294590 A1   Dec. 28, 2006

(51) Int. Cl.
G06F 21/00 (2006.01)
G06F 11/30 (2006.01)
G06F 15/16 (2006.01)

(52) U.S. Cl. .......................... 726/23; 726/25
(58) Field of Classification Search ................ None
See application file for complete search history.

(56) References Cited

U.S. PATENT DOCUMENTS

| | | | | |
|---|---|---|---|---|
| 6,088,804 A * | 7/2000 | Hill et al. | | 726/25 |
| 6,275,942 B1 * | 8/2001 | Bernhard et al. | | 726/22 |
| 6,769,066 B1 * | 7/2004 | Botros et al. | | 726/23 |
| 6,952,779 B1 * | 10/2005 | Cohen et al. | | 726/22 |
| 7,150,045 B2 * | 12/2006 | Koelle et al. | | 726/26 |
| 7,185,368 B2 * | 2/2007 | Copeland, III | | 726/25 |
| 7,237,265 B2 * | 6/2007 | Reshef et al. | | 726/25 |
| 7,308,714 B2 * | 12/2007 | Bardsley et al. | | 726/23 |
| 7,370,358 B2 * | 5/2008 | Ghanea-Hercock | | 726/23 |
| 7,389,537 B1 * | 6/2008 | Callon et al. | | 726/22 |
| 7,475,426 B2 * | 1/2009 | Copeland, III | | 726/23 |
| 7,512,808 B2 * | 3/2009 | Liang | | 713/188 |
| 7,523,493 B2 * | 4/2009 | Liang et al. | | 726/13 |
| 7,555,777 B2 * | 6/2009 | Swimmer et al. | | 726/23 |
| 7,603,714 B2 * | 10/2009 | Johnson et al. | | 726/25 |
| 7,730,537 B2 * | 6/2010 | Bardsley et al. | | 726/23 |
| 7,743,415 B2 * | 6/2010 | Poletto et al. | | 726/23 |
| 7,757,283 B2 * | 7/2010 | Robert et al. | | 726/22 |
| 7,779,119 B2 * | 8/2010 | Ginter et al. | | 709/224 |
| 7,788,718 B1 * | 8/2010 | Fei et al. | | 726/22 |
| 2003/0110392 A1 * | 6/2003 | Aucsmith et al. | | 713/200 |
| 2005/0257263 A1 * | 11/2005 | Keohane et al. | | 726/22 |
| 2006/0095965 A1 * | 5/2006 | Phillips et al. | | 726/22 |
| 2007/0180526 A1 * | 8/2007 | Copeland | | 726/23 |
| 2007/0294756 A1 * | 12/2007 | Fetik | | 726/11 |
| 2009/0044024 A1 * | 2/2009 | Oberheide et al. | | 713/188 |
| 2009/0064334 A1 * | 3/2009 | Holcomb | | 726/24 |
| 2010/0037315 A1 * | 2/2010 | Seifert et al. | | 726/22 |

OTHER PUBLICATIONS

Matthew Williamson, Throttling Viruses: Restricting Propagation to Defeat Malicious Mobile Code, Jun. 17, 2002, pp. 1-6, Hewlett-Packard Co., Ft. Collins, CO.

Hewlett-Packard Co, HP Virus Throttle Technology:Stealth Defense Against Malicious Code in Microsoft Window Environments, Technology Brief, 2005, pp. 1-11, HP, Ft. Collins, CO.

* cited by examiner

Primary Examiner—Christopher A Revak

(57) ABSTRACT

Systems, methodologies, media, and other embodiments associated with making an automated immune response on a computer that may be infected with a malicious software like a virus are described. One exemplary system embodiment includes a behavior logic that faciltates identifying that a computer is exibiting a behavior that indicates that the computer may be infected by a malicious software. The exemplary system embodiment may also include an immune response logic that is configured to facilitate identifying a process and/or program related to the behavior. The immune response logic may be configured to automatically make an immune response with respect to the process and/or program.

28 Claims, 5 Drawing Sheets

AUTOMATED IMMUNE RESPONSE FOR A COMPUTER

BACKGROUND

Computers get attacked by malicious software like viruses, worms, and so on. Signature based anti-virus systems and methods take a prophylactic approach to attempt to protect computers by recognizing known unique strings within strains of malicious software and then taking actions like quarantining the code, removing the code, disabling the code, and so on. However, signature based anti-virus systems may tend to lag behind virus writers leaving a computer vulnerable to newly written viruses that do not include known, identifiable unique strings. In one example, a virus signature may be regarded as being a set of bytes in a code fragment that uniquely identify the code fragment as a virus.

Computers with which an infected computer may communicate may also be vulnerable. For example, during virus propagation, an infected machine may attempt to connect to a large number of different machines in a short time period. By contrast, an uninfected machine may attempt fewer connections, and those connections may be locally correlated, representing repeat connections to recently accessed machines.

Thus, some computers may also use immune response-like approaches like virus throttling. These types of systems and methods attempt to respond to viruses that have not yet been identified by their signature and thus for which there is no vaccine. Therefore, "immune response", as used herein, refers to recognizing that a system like a computer may be infected and then taking actions in response to the virus. The "immune response" does not depend on identifying what virus is infecting a computer, merely identifying that a virus is infecting a computer. Virus throttling techniques identify when a computer is exhibiting suspicious "virus-like" behavior and then take preventative measures. For example, if a computer begins to make unusual connections and/or unusual numbers of connections, then it may be infected and under the influence of malicious software. A virus throttling technique may therefore make it more difficult, if possible at all, for the affected computer to make connections to other computers. This facilitates mitigating damages to other computers.

In one example, a throttling system or method may implement a filter on a network stack. The filter may be configured with a set of timeouts that facilitate restricting the rate of connection establishment to new hosts. Normal behavior will not stress the timeouts and thus will not be affected. However, abnormal behavior like a large number of attempted connections to a large number of newly accessed machines in a short period of time may stress the timeouts and thus be restricted. This may be referred to as "behavior blocking" in that a policy for allowed behavior(s) of a system are defined and transgressions of those policies are detected and responded to. Virus throttling based behavior blocking seeks to mitigate damages incurred when a system is infected by limiting the rate of connections to new hosts and thus limiting the spread of the infection.

Throttling systems may have components that operate substantially in parallel. A connection system may identify whether connection requests are directed to hosts outside the typical set of hosts accessed by the system while a timing system may limit the rate at which those connections may be made. The rate at which connections may be made may depend, for example, on the volume of connections that are being attempted. Throttling systems have been demonstrated to be effective in determining that a system is exhibiting behavior associated with virus infection and also in limiting the spread of the infection by choking off communications leaving the system.

Viruses may attempt to spread from computer to computer by attaching themselves to a host program that may be transmitted to computers reachable from an infected system. Worms may scan networks and attempt to replicate themselves. One main threat from viruses and worms is their ability to rapidly infect large numbers of hosts and to negatively impact computer networks by creating vast amounts of network traffic. Malicious software becomes even more dangerous when it spreads faster than it can be eradicated.

Under normal conditions, a computer may have a relatively low rate of connections and a relatively short list of computers to which it connects. Under infected conditions, an infected system may have a relatively high rate of connections and relatively large list of computers to which it attempts to connect. Thus, throttling systems may, upon detecting a connection request, identify the intended destination to determine whether it is on the short list of commonly accessed systems. If so, it may be processed directly. If not, the packet may be sent to a delay queue. Packets may be released from the delay queue at regular intervals and then processed. The rate at which packets are released may be configurable. In one example, if the delay queue holds several packets for the same host, when the first of these packets is processed, the remaining packets may also be processed. However, if the delay queue fills because, for example, the rate of new connection requests exceeds an acceptable rate, then this may be an indication of suspicious infection-indicating behavior.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
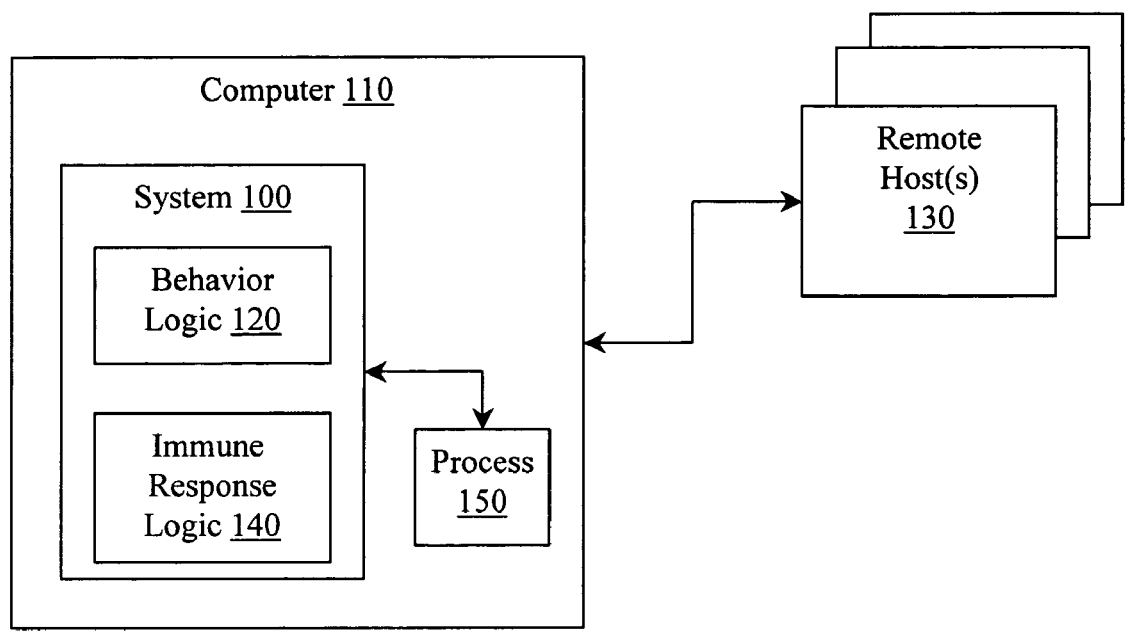
FIG. 1 illustrates an example system associated with identifying and reacting to malicious software infecting a computer.

Example systems, methods, media, and other embodiments described herein relate to automatically identifying and responding to malicious software infecting a computer. In one example, automated immune response software may run substantially in parallel with virus throttling systems and/or methods.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer communication", as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data. A computer-readable medium may take forms, including, but not limited to, non-volatile media, volatile media, and transmission data. Non-volatile media may include, for example, optical or magnetic disks and so on. Volatile media may include, for example, semiconductor memories, dynamic memory and the like. Transmission media may include coaxial cables, copper wire, fiber optic cables, and the like. Common forms of a computer-readable medium include, but are not limited to, a floppy disk, a hard disk, a magnetic tape, other magnetic medium, a CD-ROM, other optical medium, a RAM (random access memory), a ROM (read only memory), an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software stored on a computer-readable storage medium, and/or combinations of each to perform a function(s) or an actions(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be considered to be operably connected if they are able to communicate signals to each other directly or through one or more intermediate entities like a processor, an operating system, a logic, software stored on a computer-readable storage medium, or other entity. Logical and/or physical communication channels can be used to create an operable connection.

A "process" is an executing instantiation of an executable computer program. "Executing" includes states like running, halted, asleep, blocked, and so on. The executable computer program may be stored, for example, as a program file in memory, on disk, on a server, and so on. The executable program may be in an executable form (e.g., executable code) and/or a form from which an executable may be made (e.g., source code). A process may have one or more executable threads.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend, for example, on requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Software suitable for implementing the various components of the example systems and methods described herein may include software produced using programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

FIG. 1 illustrates a system 100 for identifying and responding to malicious software infecting a computer. Malicious software may include, for example, computer viruses, worms, and the like. System 100 is designed to be operably connectable to a computer 110. While system 100 is illustrated inside computer 110, it is to be appreciated that in some examples system 100 may be attached and/or operably connected to computer 110. Computer 110 may be, for example, a personal computer, a server, a distributed system, and other similar computerized systems that may become infected by malicious software. In one example, system 100 may be implemented in software that is installed on computer 110. In another example, system 100 may be implemented in hardware like an application specific integrated circuit (ASIC), a field programmable gate array (FPGA), a plug-in circuit board, and the like, and thus may be permanently and/or removably attached to computer 110. For example, computer 110 may include a socket into which an ASIC implementing system 100 may be plugged.

System 100 may include a behavior logic 120 that is configured to identify that computer 110 is exhibiting behavior that indicates it may be infected by malicious software. The behavior may be related to the number of connections computer 110 is trying to make to remote hosts 130. The behavior may also be related to the identity of the remote hosts 130 to which computer 110 is trying to connect. By way of illustration, a healthy non-infected computer may connect to a relatively small (e.g., ten) set of remote hosts at a relatively low rate (e.g., one connection per second). By contrast, an infected computer may attempt to connect to a relatively larger (e.g., one thousand) set of remote hosts at a relatively higher rate (e.g., one hundred per second). Thus, in one example, by examining the identity and number of remote hosts to which computer 110 attempts to connect, infections may be identified without examining virus signatures.

System 100 may also include an immune response logic 140 that is configured to identify a process 150 that is executing on computer 110 and that is related to (e.g., responsible for) the behavior that indicates that computer 110 may be infected. For example, process 150 may be infected by a virus and thus may be taking actions typically taken by infected software like making an unusual number of connection requests to an unusual set of remote hosts. An operating system may store information concerning connection requests like the identity of a process making the connection request. Operating system data associated with connection requests may be operating system dependant. Thus, the method by which a connection request is related back to an initiating process may also be operating system dependent. For example, identifying the process may include determining a relationship between an executing process and a local communications socket port to which the executing process attempts to bind. While a socket is described, it is to be appreciated that different operating systems and different networking protocols may employ different communications hardware and software. However, generally, identifying a suspicious process may include identifying initiators of requests to connect.

Thus, immune response logic 140 may be configured to identify that computer 110 is acting like it is infected by a virus by identifying that a request to connect to a remote host(s) 130 has been made, identifying the remote host(s) 130 to which the request applies, and identifying a rate at which attempts to connect to remote host(s) 130 are being made by processes executing on computer 110. The number of connection requests and the hosts towards which they are directed may provide information about whether computer 110 is infected by malicious software and what process(es) are carrying out the work of the malicious software.

To facilitate combating the infection, immune response logic 140 may be configured to automatically make an immune response with respect to the identified process 150. As described above, an immune response refers to recognizing that a system like computer 110 may be infected and then taking actions in response to the virus. Once again, an "immune response" as described herein does not depend on determining that any particular virus is infecting a computer. Rather, the immune response is predicated upon simply identifying that some virus or other malicious, unwanted software is infecting a computer. In one example, this facilitates substantially instantaneously responding to a virus even if the virus is a new virus for which there is no virus signature available. The substantially instantaneous response also facilitates reducing the rate at which a virus may spread. In one example, "substantially instantaneously" means "as soon as possible using an automatic process not requiring human response". As soon as possible may be affected by whether system 100 is implemented in hardware and/or software. As soon as possible may be also be affected by whether system 100 shares a processor with computer 110.

The immune response may be designed to act in a relatively benign manner like identifying the process and generating a report (e.g., database record) concerning the process. The immune response may, additionally and/or alternatively, be designed to act in a more aggressive manner like isolating the infected process or even destroying it. Thus, immune responses may include, but are not limited to, generating a process purging signal, quarantining the executing process, deleting the executing process, modifying the executing process, adjusting and/or degrading a process priority, and de-activating the executing process. In one example, a user may be able to control the type of immune response action taken based on a configuration parameter. Generating a process purging signal may include, for example, generating an interrupt, sending an email, displaying a record on a display, adding a record to a database, and the like. Quarantining an executing process may include, for example, relocating the process of one operating system queue and placing it in a different operating system queue, assigning the process to a special processor, and so on. Modifying the process may include, for example, changing execution parameters of the process, encapsulating the process in another prophylactic process, adding delay code to the process, and so on. Adjusting the process priority may facilitate reducing the number of scheduling opportunities for the process and thus may facilitate lessening the impact of the process.

To facilitate rapidly responding to an infection and to facilitate not introducing additional latency to processing performed in computer 110, behavior logic 120 and immune response logic 140 may be configured to operate substantially in parallel with each other. Furthermore, behavior logic 120 and immune response logic 140 may be configured to operate substantially in parallel with an operating system executing on computer 110. Behavior logic 120 and immune response logic 140 may operate "substantially in parallel" as opposed to "purely in parallel" when they are implemented in software and share a microprocessor. Behavior logic 120 and immune response logic 140 may operate purely in parallel when they are implemented in hardware and do not share a common processor.

To facilitate reducing the damage that computer 110 may inflict on other computers when infected, behavior logic 120 may be configured to selectively delay requests for connections to remote hosts 130. Whether and/or how much a request is delayed may depend, at least in part, on whether the remote host is a member of a set of remote hosts 130 with which computer 110 has communicated within a pre-defined, configurable period of time. For example, a healthy computer may tend to communicate with the same relatively small set of hosts at a known, characteristic, and/or learnable connection rate. Thus, behavior logic 120 may be configured to selectively increase a time period by which the request to connect is delayed. How long the request is delayed may be based, at least in part, on the rate at which attempts to connect to remote hosts 130 are being made by processes executing on computer 110.

Figure 2:
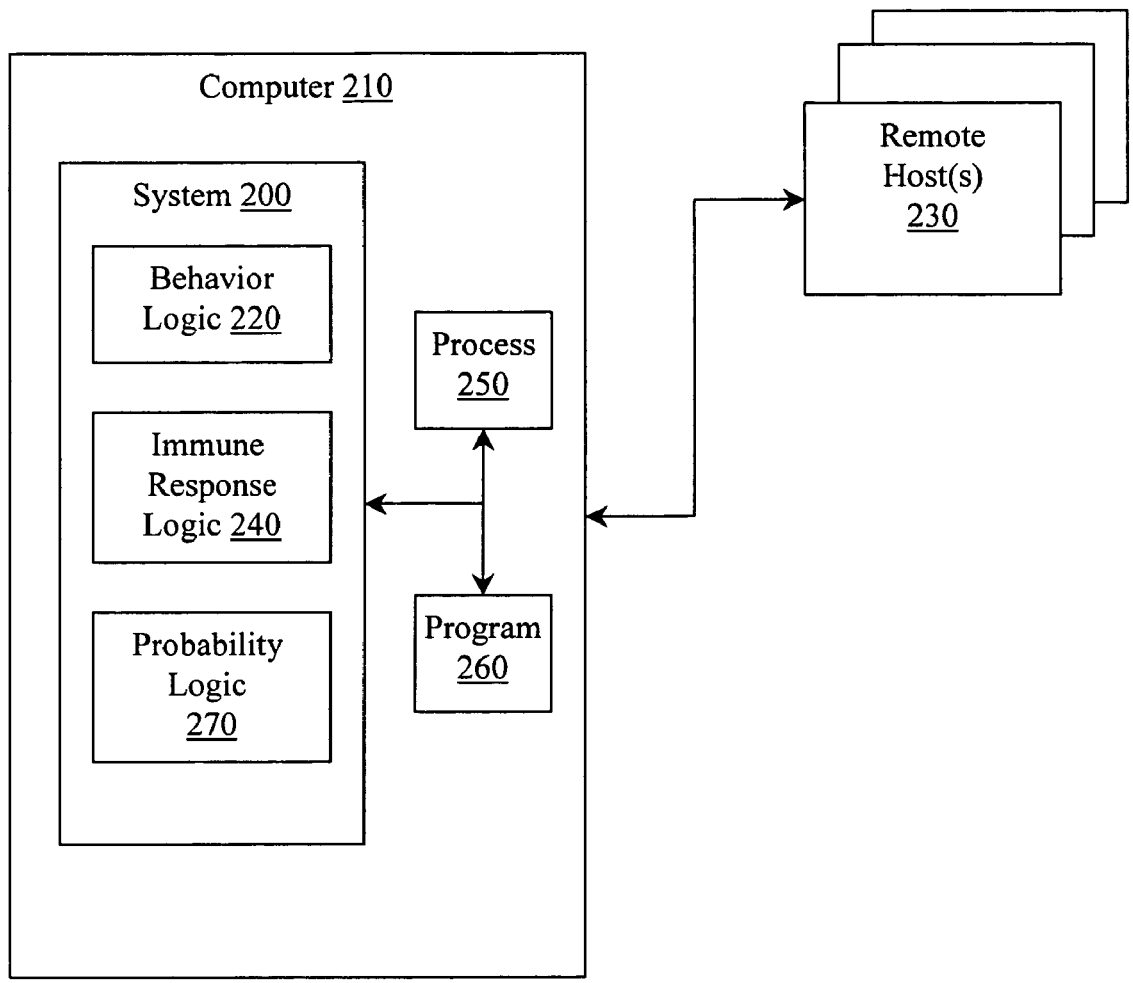
FIG. 2 illustrates another example system associated with identifying and reacting to malicious software infecting a computer.

FIG. 2 illustrates a system 200 that is similar in some ways to system 100 (FIG. 1). For example, system 200 may be operably connected to a computer 210 and may include a behavior logic 220 similar to behavior logic 120 and an immune response logic 240 similar to immune response logic 140. However, system 200 may also include additional functionality. For example, in system 200, immune response logic 240 may additionally be configured to identify a program 260 from which process 250 is descended. It is to be appreciated that from one point of view a process is an executing instantiation of an executable computer program. The executable computer program may be stored, for example, as a program file in memory, on disk, on a tape, on a server, and so on. It is to be further appreciated that in some examples a process may include one or more threads.

Having identified the program 260 from which process 250 is descended, and having identified that process 250 is taking actions dictated by the malicious code, (e.g., unusual connections, unusual connection rate) immune response logic 240 may be configured to make a program immune response with respect to program 260. Thus, not only will system 200 attack the symptoms of an infection (e.g., connection requests) but may also attack the host of the infection (e.g., program 260). Program immune responses may include, but are not limited to, generating a program purging signal, quarantining the program, deleting the program, renaming the program, modifying the program, changing permissions for the program, and moving the program. Thus, like the process immune responses, the program immune responses may range from the relatively benign like reporting on the identity of program 260 to the relatively fatal like erasing program 260. Generating a program purging signal may include, for example, generating an interrupt, displaying a record on a monitor, adding a record to a database, writing an entry to a log, causing an audible and/or visual alarm to sound, and so on. Quarantining a program may include, for example, moving the program to a special data store from which executable processes can not be spawned, moving the program to a special machine, encapsulating the program in a prophylactic object wrapper, and the like. Changing permissions for the program may include, for example, removing read permissions, removing execute permissions, and so on.

Since more than one executable process may be spawned from an executable program, immune response logic 240 may also be configured to track down other processes descended from program 260. Furthermore, immune response logic 240 may also be configured to automatically make an immune response with respect to the other processes descended from program 260. Once again, the operating system information relating processes to programs and programs to processes may vary. Thus, the method for making the connections may be operating system specific.

System 200 may also include a probability logic 270. While probability logic 270 is illustrated as a separate component, it is to be appreciated that in different examples processing performed by probability logic 270 may be performed in immune response logic 240, behavior logic 220, computer 210, and/or other locations. Probability logic 270 may be configured to assign a weighted probability to a process that has made a connection request to a remote host. The weighted probability may describe a likelihood that the process is affected by and/or is associated with a malicious software. "Associated with", when used to describe a relationship between a process and/or program and a virus may include being infected by the virus, being the virus, being manipulated by the virus, being controlled by the virus, and so on. The likelihood may be determined, for example, by comparing a rate at which the process is connecting to remote hosts, examining the set of remote hosts to which the process is connecting, and other factors. Since a probability is available, probability logic 280 may also be configured to establish a ranking for processes relative to other processes. The ranking may order processes in terms of which process is most likely associated with and/or being affected by a virus. Thus, delays for connection requests may be delayed by an amount related to the relative rank of a process, immune response actions may be taken with respect to the process most likely associated with a virus, and so on.

Thus, in one example, immune response logic 240 may be configured to automatically make an immune response based, at least in part, on the weighted probability and rank for a process as established by probability logic 270. Immune response logic 240 may also be configured to identify a program from which the process selected by weighted probability and rank is descended and to take a program immune response action with respect to the program. To provide even deeper protection, immune response logic 240 may be configured to identify additional processes that are descendants of the program and to make an immune response with respect to the additional processes.

To illustrate one implementation of a system 200, consider a situation where throttling software associated with system 200 selectively adds and removes processes from a delay queue. In this situation, system 200 may maintain a process information list and a program file information list. A process information list entry may be associated with exactly one program file list entry. A program file list entry may be associated with one or more process information list entries.

When a process is added to the delay queue, the throttling software may check to see whether the process is already on the process information list. If it is not on the list, it may be added to the list. Then, the throttling software may identify a program file associated with the process. The throttling software may then check to see if the program file is already on the program file information list and if it is not on the list add it to the list.

When adding to the lists, the throttling software may increment a "hit count" for both the process and the program file. When the hit count exceeds a limit, or when a process or program file acquires the highest hit count, then the process or program file may be singled out for an immune response. When a process is removed from the delay queue, the hit counts may be decremented. When the hit count reaches zero, the process and program file may be removed from the process information list and the program file information list.

The hit count may function as the relative weighting related to the likelihood that a process or program file are affected by a virus. Thus, immune responses may be predicated on the hit count and/or a position in a list of processes having hit counts. While process information lists, program file information lists, hit counts, and the like are described in the example, it is to be appreciated that other data structures, and so on may be employed in other examples.

In the example, and in the discussion of the example systems and methods, a process and/or program file may be singled out for an immune response. In different examples, the systems and methods may be configured to handle a "false positive" situation. For example, a system or method may conclude that a process and/or program file is affected by, infected by, or associated with a virus. However, an administrator may conclude that the process and/or program file is not affected by, infected by, or associated with a virus. Therefore the administrator may designate the process and/or program file as a "friendly file". Files so designated may then be exempt from immune responses and may also be exempt from being placed on a delay queue.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that in different examples, various actions could occur concurrently, substantially in parallel, and/or at substantially different points in time.

Figure 3:
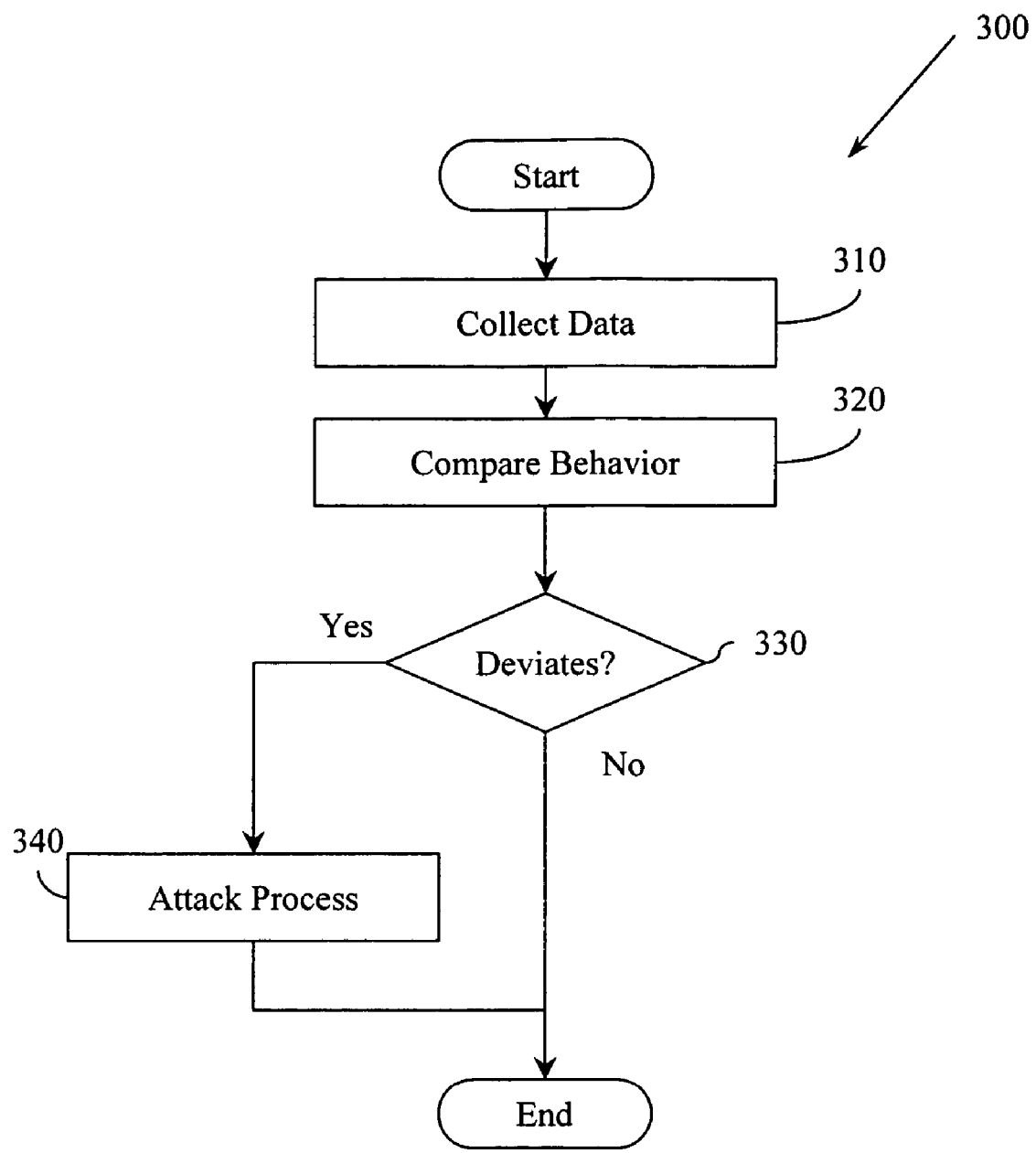
FIG. 3 illustrates an example method for identifying and attacking processes associated with malicious software infecting a computer.

FIG. 3 illustrates an example methodology 300 associated with identifying and automatically attacking processes that are likely associated with and/or affected by malicious code like viruses, worms, and the like. The illustrated elements denote "processing blocks" that may be implemented in logic. In one example, the processing blocks may represent executable instructions that cause a computer, processor, and/or logic device to respond, to perform an action(s), to change states, and/or to make decisions. Thus, in one example, described methodologies may be implemented as processor executable instructions and/or operations provided by a computer-readable medium. In another example, processing blocks may represent functions and/or actions performed by functionally equivalent circuits like an analog circuit, a digital signal processor circuit, an application specific integrated circuit (ASIC), or other logic device. FIG. 3 and the other figures illustrating methods are not intended to limit the implementation of the described examples. Rather, the figures illustrate functional information one skilled in the art could use to design/fabricate circuits, generate software, or use a combination of hardware and software to perform the illustrated processing.

It will be appreciated that electronic and software applications may involve dynamic and flexible processes and thus in some examples the illustrated blocks can be performed in other sequences different than the one shown and/or blocks may be combined or separated into multiple components. In some examples, blocks may also be performed concurrently, substantially in parallel, and/or at substantially different points in time. They may also be implemented using executable code produced using various programming approaches like machine language, procedural, object oriented and/or artificial intelligence techniques.

FIG. 3 illustrates a computer executable method 300 for identifying and automatically responding to processes associated with malicious software infecting a computer. Method 300 may include, at 310, collecting data from an operating computer. The data may describe an operating behavior of the computer. The operating behavior may include, for example, the number of connections made to remote hosts over a period of time, the rate at which connections are made, the hosts to which connections are made, new hosts to which connections are attempted, and the like. This data may therefore be useful for identifying whether the computer from which the data was gathered is operating in a suspicious manner that may indicate that it is infected by a virus, worm, or the like. The data may be electronic data that can be processed by a computer and stored in a computer memory or data store.

Method 300 may also include, at 320, comparing the operating behavior to a non-infected behavior of the computer. The non-infected behavior may also be described by a set of electronic data concerning attributes like connections, connection rates, remote hosts, and so on. Thus, in one example, method 300 may access a data store in which data previously acquired from a non-infected computer is stored. In another example, the non-infected behavior may be associated with data from a model rather than from an actual computer. For example, the model may describe predicted normal behavior and predicted unusual behavior. Thus, in different examples the non-infected behavior of the computer may be ascertained from either actual data and/or modeling data.

Method 300 may also include, at 330, determining whether the operating behavior deviates by more than a pre-determined, configurable amount from the non-infected behavior. If the determination at 330 is Yes, then method 300 may continue at 340 by automatically taking a counter-infection action. The counter-infection action may include identifying an executable responsible for making a connection request. The executable may be, for example, a process, a thread, and the like. The counter-infection action may also include automatically performing an action like terminating the executable, delaying the executable, destroying the executable, modifying the executable, and quarantining the executable. Which counter-infection action is taken may be controlled, at least in part, by a user-established setting for a configuration parameter.

While FIG. 3 illustrates various actions occurring in serial, it is to be appreciated that various actions illustrated in FIG. 3 could occur substantially in parallel. By way of illustration, a first process could collect behavior data, a second process could compare the behavior data to desired behavior data, and a third process could selectively make an immune response. While three processes are described, it is to be appreciated that a greater and/or lesser number of processes could be employed and that lightweight processes, regular processes, threads, and other approaches could be employed.

In one example, methodologies are implemented as processor executable instructions and/or operations stored on a computer-readable medium. Thus, in one example, a computer-readable medium may store processor executable instructions operable to perform a method that includes collecting from an operating computer a set of electronic data that describes an operating behavior of the computer. The method may also include comparing the operating behavior to a non-infected behavior of the computer and selectively automatically taking a counter-infection action. Whether the action is taken and/or which action is taken may depend, at least in part, on the degree to which the operating behavior deviates from the non-infected behavior. While the above method is described being stored on a computer-readable medium, it is to be appreciated that other example methods described herein can also be stored on a computer-readable medium.

Figure 4:
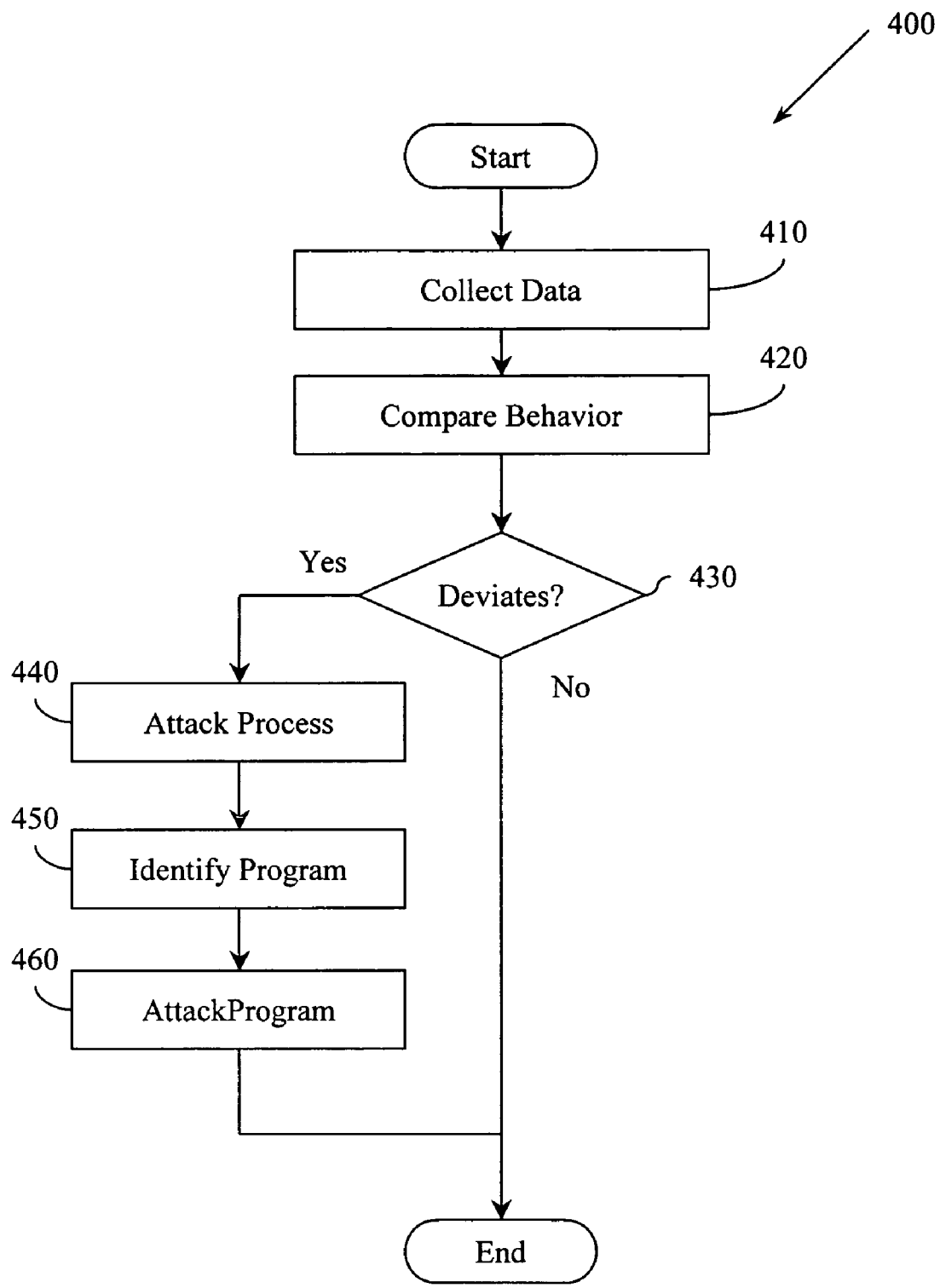
FIG. 4 illustrates an example method for identifying and attacking processes and programs associated with malicious software infecting a computer.

FIG. 4 illustrates an example methodology 400 associated with automatically identifying and attacking processes and programs that are likely associated with and/or affected by malicious code like viruses, worms, and the like. Method 400 includes actions 410 through 440 that are similar to corresponding actions 310 through 340 (FIG. 3). However, method 400 also includes additional functionality.

For example, method 400 may also include, at 450, identifying a non-executing program from which the executable process is descended. The non-executing program may be, for example, a program stored on disk. It may be the program stored on disk that is actually infected or that is actually the host of the virus. Thus, while attacking a process that performs actions for the virus provides a first level immune response and a first level of protection, back tracking to the program from which the process is descended will provide an additional immune response and additional protection.

Having identified the non-executing program at 450, method 400 may also include, at 460, automatically taking an action like destroying the non-executing program, modifying the non-executing program, relocating the non-executing program, renaming the non-executing program, changing an operating attribute of the non-executing program, preventing additional executables from being descended from the non-executing program, and the like. Thus, the action taken with respect to the program may be relatively benign (e.g., reporting its name to an operator) or may be relatively toxic (e.g., deleting the program). The action taken may depend on a user-established setting for a configuration parameter.

Figure 5:
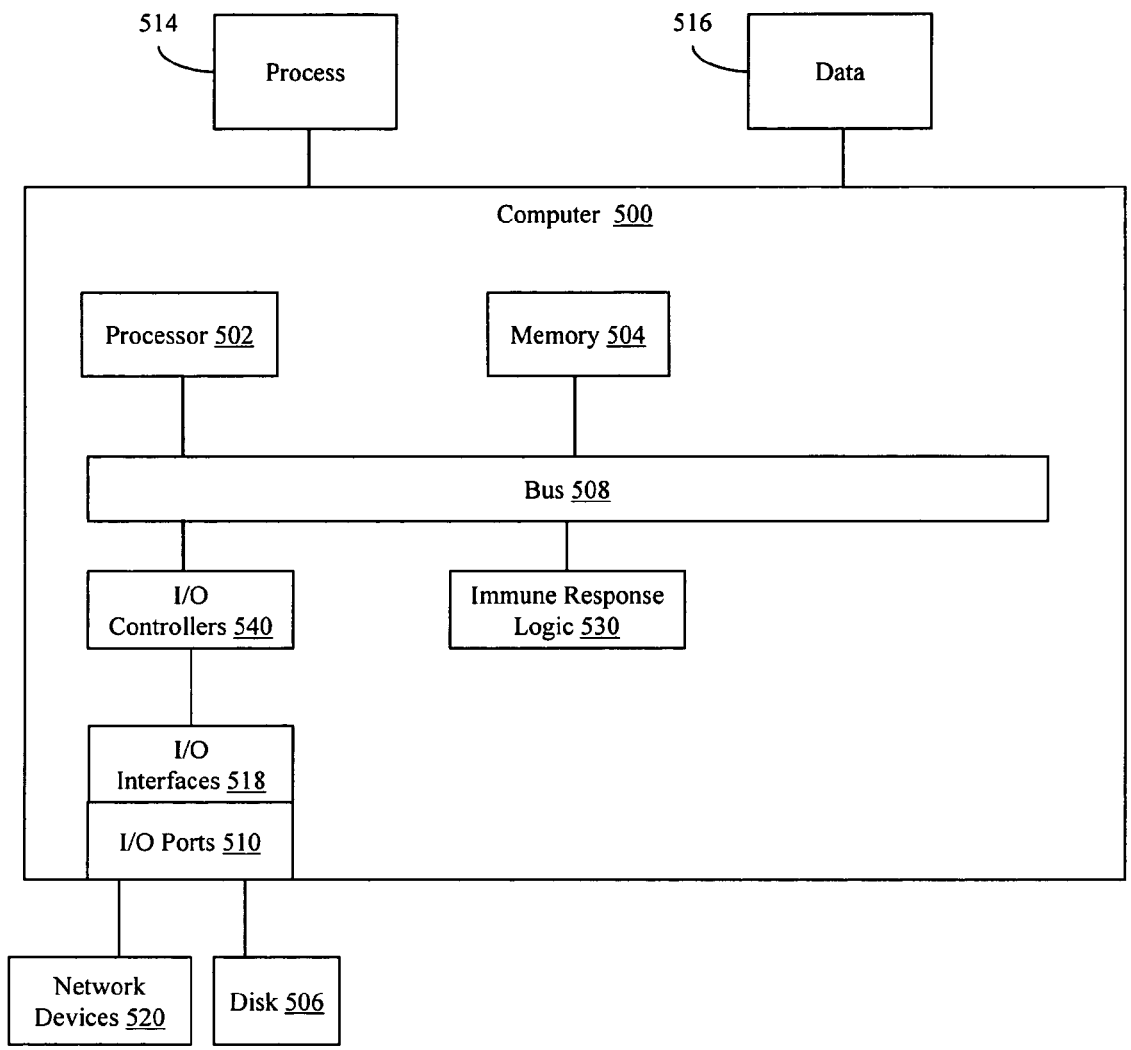
FIG. 5 illustrates an example computing environment in which example systems and methods illustrated herein can operate.

FIG. 5 illustrates an example computing device in which example systems and methods described herein, and equivalents, can operate. The example computing device may be a computer 500 that includes a processor 502, a memory 504, and input/output (i/o) controllers 540 operably connected by a bus 508. In one example, computer 500 may include an immune response logic 530 that is configured to facilitate identifying and/or attacking processes and/or programs that may be affected by malicious code like viruses, worms, and so on. While immune response logic 530 is illustrated as a hardware component attached to bus 508, it is to be appreciated that in one example, immune response logic 530 could be implemented in software, stored on disk 506, brought into memory 504, and executed by processor 502. While FIG. 5 describes one example computing device, it is to be appreciated that example systems and methods described herein may operate with other types of computer devices.

Thus, immune response logic 530 may provide means (e.g., software, hardware, firmware) for determining that a computer may be infected with a virus without analyzing a virus signature. Immune response logic 530 may also provide means (e.g., software, hardware, firmware) for identifying an executable running on the computer that may be affected by the virus. Furthermore, immune response logic 530 may also provide means (e.g., hardware, software, firmware) for identifying a non-executable residing on the computer, the executable being derived from the non-executable and means (e.g., hardware, software, firmware) for automatically manipulating the executable and the non-executable.

Generally describing an example configuration of computer 500, processor 502 can be a variety of various processors including dual microprocessor and other multi-processor architectures. Memory 504 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 506 may be operably connected to computer 500 via, for example, an i/o interface (e.g., card, device) 518 and an i/o port 510. Disk 506 may be, for example, devices like a magnetic disk drive, a solid state disk drive, a floppy disk drive, a tape drive, a Zip drive, a flash memory card, and/or a memory stick. Furthermore, disk 506 may be devices like optical drives (e.g., a CD-ROM), a CD recordable drive (CD-R drive), a CD rewriteable drive (CD-RW drive), and/or a digital video ROM drive (DVD ROM). Memory 504 can store processes 514 and/or data 516, for example. Disk 506 and/or memory 504 can store an operating system that controls and allocates resources of computer 500.

Bus 508 may be a single internal bus interconnect architecture and/or other bus or mesh architectures. While a single bus is illustrated, it is to be appreciated computer 500 may communicate with various devices, logics, and peripherals using other busses that are not illustrated (e.g., PCIE, SATA, Infiniband, 1394, USB, Ethernet). Bus 508 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

Computer 500 may interact with i/o devices via i/o interfaces 518 and i/o ports 510. I/o devices can include, but are not limited to, a keyboard, a microphone, a pointing and selection device, cameras, video cards, displays, disk 506, network devices 520, and the like. I/o ports 510 may include but are not limited to, serial ports, parallel ports, and USB ports.

Computer 500 may operate in a network environment and thus may be connected to network devices 520 via i/o devices 518, and/or i/o ports 510. Through network devices 520, computer 500 may interact with a network. Through the network, computer 500 may be logically connected to remote computers. The networks with which computer 500 may interact include, but are not limited to, a local area network (LAN), a wide area network (WAN), and other networks. Network devices 520 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, network devices 520 can connect to WAN technologies including, but not limited to, point to point links, circuit switching networks like integrated services digital networks (ISDN), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system operably connectable to a computer, the system comprising:
    a behavior logic stored on a computer-readable recording medium, configured to identify that the computer is exhibiting a behavior that indicates that the computer may be infected by a malicious software; and
    an immune response logic stored on a computer-readable recording medium, configured to identify that a request to connect to a remote host has been made, identify the remote host to which the request applies, identify a rate at which attempts to connect to remote hosts are being made by processes executing on the computer to identify that the computer is exhibiting the behavior, identify a process that is related to the behavior and that is executing on the computer, the immune response logic also being configured to automatically make an immune response with respect to the process,
    the behavior logic and the immune response logic being configured to operate substantially in parallel with each other and with an operating system executing on the computer.

2. The system of claim 1, the behavior logic being configured to selectively delay the request to connect to the remote host based, at least in part, on whether the remote host is a member of a set of remote hosts with which the computer has communicated within a pre-defined, configurable period of time and to selectively increase a time period by which the request to connect is delayed based, at least in part, on the rate at which attempts to connect to remote hosts are being made by processes executing on the computer.

3. The system of claim 1, where identifying the process that is related to the behavior includes identifying an executing process that initiated the request to connect.

4. The system of claim 3, where identifying the executing process includes determining a relationship between an executable and a local communications socket port to which the executable attempts to bind.

5. The system of claim 3, the immune response being one of, generating a process purging signal, quarantining the executing process, deleting the executing process, modifying the executing process, adjusting a scheduling priority for the executing process, and de-activating the executing process.

6. The system of claim 3, the immune response logic being configured to identify a program from which the executing process is descended and to make a program immune response with respect to the program.

7. The system of claim 6, the program immune response being one of, generating a program purging signal, quarantining the program, deleting the program, renaming the program, modifying the program, changing a permission for the program, and moving the program.

8. The system of claim 6, the immune response logic being configured to identify one or more second processes descended from the program and to automatically make an immune response with respect to the one or more second processes.

9. The system of claim 1, including a probability logic stored on a computer-readable recording medium, configured to assign a weighted probability to the process that has made the connection request to the remote host, the weighted probability describing a likelihood that the process is associated with a malicious software, the probability logic also being configured to establish a rank for the process relative to other processes with respect to a likelihood that the process is associated with a malicious software.

10. The system of claim 9, the immune response logic being configured to automatically make an immune response based, at least in part, on the weighted probability and the rank for the process, to identify a program from which the process is descended and to take a program immune response action with respect to the program, and to identify one or more second processes that are descendants of the program and to make an immune response with respect to the second processes.

11. A system operably connectable to a computer, the system comprising:
    a behavior logic stored on a computer-readable recording medium, configured to identify that the computer is exhibiting a behavior that indicates that the computer may be infected by a malicious software; and
    an immune response logic stored on a computer-readable recording medium, configured to identify a process that is related to the behavior and that is executing on the computer, the immune response logic also being configured to automatically make an immune response with respect to the process, the immune response being one of, generating a process purging signal, quarantining the executing process, deleting the executing process, modifying the executing process, adjusting a scheduling priority for the executing process, and de-activating the executing process, the immune response logic being configured to identify that the computer is exhibiting the behavior by identifying that a request to connect to a remote host has been made, by identifying the remote host to which the request applies, and by identifying a rate at which attempts to connect to remote hosts are being made by processes executing on the computer, the immune response logic also being configured to identify a program from which the executing process is descended and to make a program immune response with respect to the program, the program immune response being one of, generating a program purging signal, quarantining the program, deleting the program, renaming the program, modifying the program, changing a permission for the program, and moving the program, the immune response logic also being configured to identify one or more second processes descended from the program and to automatically make an immune response with respect to the one or more second processes, the behavior logic and the immune response logic being configured to operate substantially in parallel with each other and with an operating system executing on the computer, the behavior logic being configured to selectively delay the request to connect to the remote host based, at least in part, on whether the remote host is a member of a set of remote hosts with which the computer has communicated within a pre-defined, configurable period of time and to selectively increase a time period by which the request to connect is delayed based, at least in part, on the rate at which attempts to connect to remote hosts are being made by processes executing on the computer.

12. A computer-readable recording medium storing processor executable instructions operable to perform a computer-executable method, the computer-executable method comprising:

identifying that a request to connect to a remote host has been made;

identifying the remote host to which the request applies;

identifying a rate at which attempts to connect to remote hosts are being made by processes executing on the computer;

comparing the rate to a non-infected behavior of the computer; and selectively automatically taking a counter-infection action based, at least in part, on determining that the operating behavior deviates by more than a pre-determined, configurable amount from the non-infected behavior, the counter-infection action being directed towards at least one executable that is at least partly responsible for the operating behavior deviating by more than the pre-determined, configurable amount.

13. The method of claim 12, the operating behavior being related to a number of connection requests being made to remote hosts by executables running on the computer and an identity of the remote hosts for which the connection requests are intended.

14. The method of claim 13, the counter-infection action comprising:

identifying an executable responsible for making a connection request; and automatically performing one or more of, terminating the executable, delaying the executable, destroying the executable, modifying the executable, changing a scheduling priority for the executable, and quarantining the executable.

15. The method of claim 14, the counter-infection action comprising:

identifying a non-executing program from which the executable is descended; and automatically performing one or more of, destroying the non-executing program, modifying the non-executing program, relocating the non-executing program, renaming the non-executing program, changing an operating attribute of the non-executing program, and preventing additional executables from being descended from the non-executing program.

16. The method of claim 15, where the counter-infection action to be taken is determined by a configuration option accessible to a user.

17. The method of claim 14, where a process and a program file can be designated by a user to be exempt from experiencing a counter-infection action.

18. A system, comprising:

means for identifying that a request to connect to a remote host has been made from a computer;

means for identifying the remote host to which the request applies;

means for identifying a rate at which attempts to connect to remote hosts are being made by processes executing on the computer to identify that the computer may be infected with a virus;

means for identifying an executable running on the computer that may be affected by the virus;

means for identifying a non-executing program residing on the computer, the executable being derived from the non-executing program; and means for automatically manipulating the executable and the non-executing program based, at least in part, on determining that the computer may be infected by a virus, wherein at least one of the means for determining that the computer may be infected with the virus without analyzing the virus signature, means for identifying the executable running on the computer that may be affected by the virus, means for identifying the non-executing program residing on the computer, and the means for automatically manipulating the executable and the non-executing program includes a processor.

19. A method comprising:

identifying that a request to connect to a remote host has been made from a computer;

identifying the remote host to which the request applies;

identifying a rate at which attempts to connect to remote hosts are being made by processes executing on the computer to identify that the computer is exhibiting a behavior that indicates that the computer may be infected by malicious software;

identifying a process that is related to the behavior and that is executing on the computer; and automatically making an immune response with respect to the process, wherein making the immune response and identifying the process are performed substantially in parallel.

20. The method of claim 19, further comprising selectively delaying the request to connect to the remote host based, at least in part, on whether the remote host is a member of a set of remote hosts with which the computer has communicated within a configurable period of time and to selectively increase a time period by which the request to connect is delayed based, at least in part, on the rate at which attempts to connect to remote hosts are being made by processes executing on the computer.

21. The method of claim 19, wherein identifying the process that is related to the behavior includes identifying an executing process that initiated the request to connect.

22. The method of claim 21, wherein identifying the executing process includes determining a relationship between an executable and a local communications socket port to which the executable attempts to bind.

23. The method of claim 21, wherein the immune response is to at least one of, generate a process purging signal, quarantine the executing process, delete the executing process, modify the executing process, adjust a scheduling priority for the executing process, and de-activate the executing process.

24. The method of claim 21, further comprising identifying a program from which the executing process is descended and making a program immune response with respect to the program.

25. The method of claim 24, wherein the program immune response is to at least one of, generate a program purging signal, quarantine the program, delete the program, renaming the program, modify the program, change a permission for the program, and move the program.

26. The system of claim 24, further comprising identifying one or more second processes descended from the program and automatically making an immune response with respect to the one or more second processes.

27. The system of claim 19, further comprising assigning a weighted probability to the process that has made the connection request to the remote host, the weighted probability describing a likelihood that the process is associated with malicious software and establishing a rank for the process relative to other processes with respect to a likelihood that the process is associated with malicious software.

28. The system of claim 27, further comprising:
   automatically making the immune response based, at least in part, on the weighted probability and the rank for the process;
   identifying a program from which the process is descended;
   taking a program immune response action with respect to the program;
   identifying one or more second processes that are descendants of the program; and
   making an immune response with respect to the second processes.

* * * * *